Sept. 24, 1957 C. BROOKS ET AL 2,807,307
APPARATUS FOR MAKING BACKED FABRIC BELTS
Filed Aug. 24, 1953 7 Sheets-Sheet 1
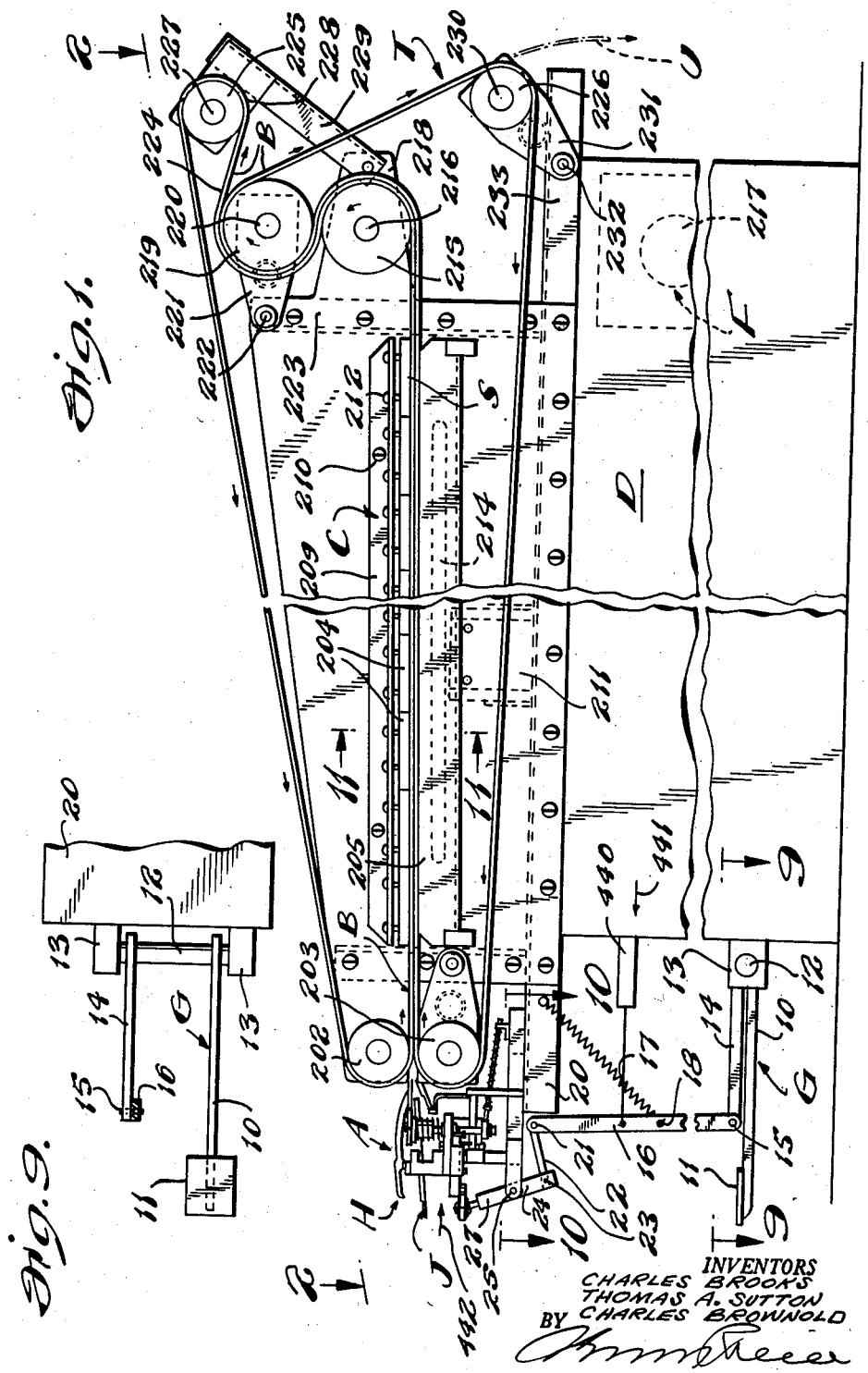
INVENTORS
CHARLES BROOKS
THOMAS A. SUTTON
CHARLES BROWNOLD
BY
ATTORNEY Sept. 24, 1957 C. BROOKS ET AL 2,807,307
APPARATUS FOR MAKING BACKED FABRIC BELTS
Filed Aug. 24, 1953 7 Sheets-Sheet 2
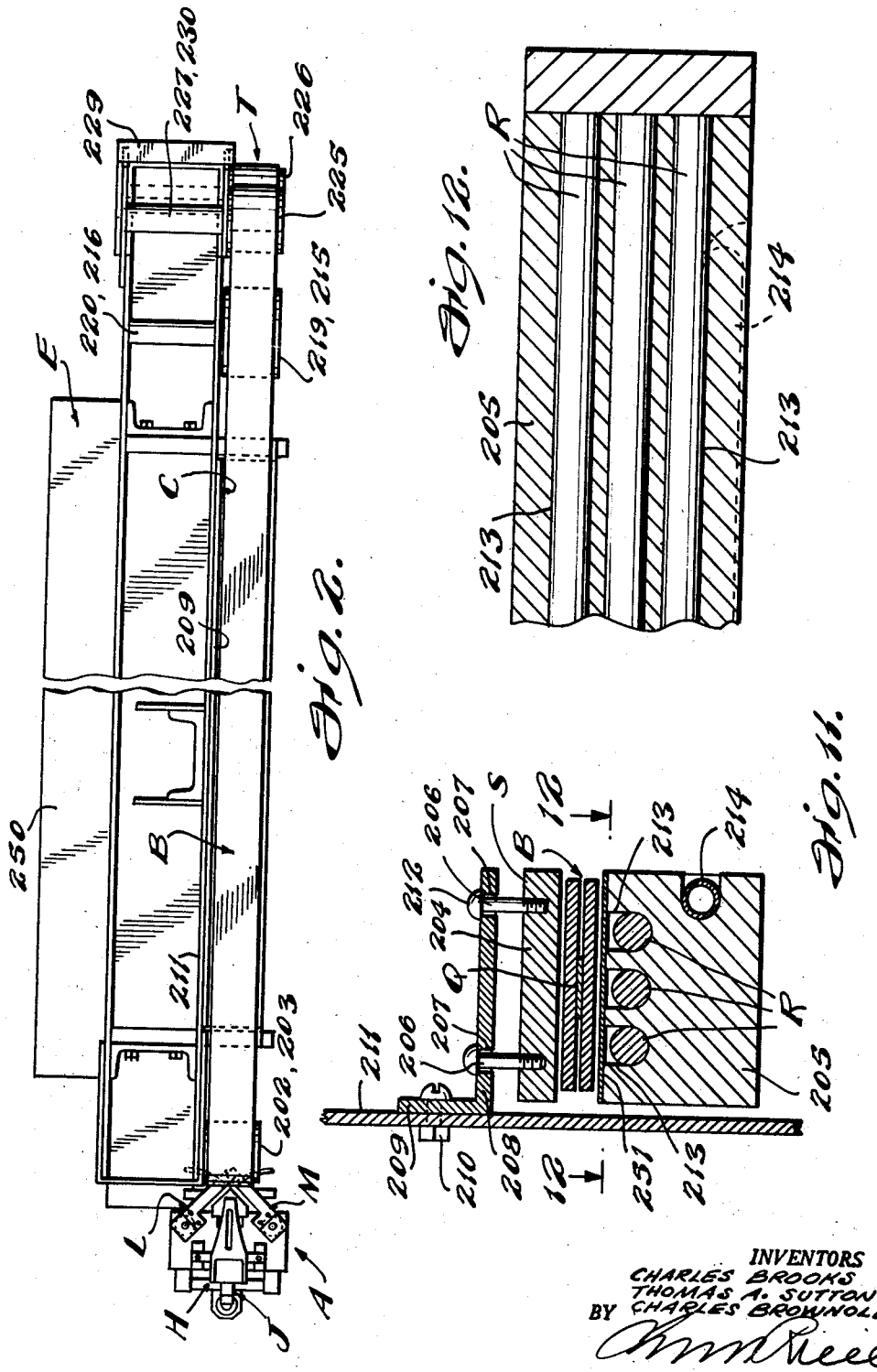
INVENTORS
CHARLES BROOKS
THOMAS A. SUTTON
BY CHARLES BROWNOLD
ATTORNEY

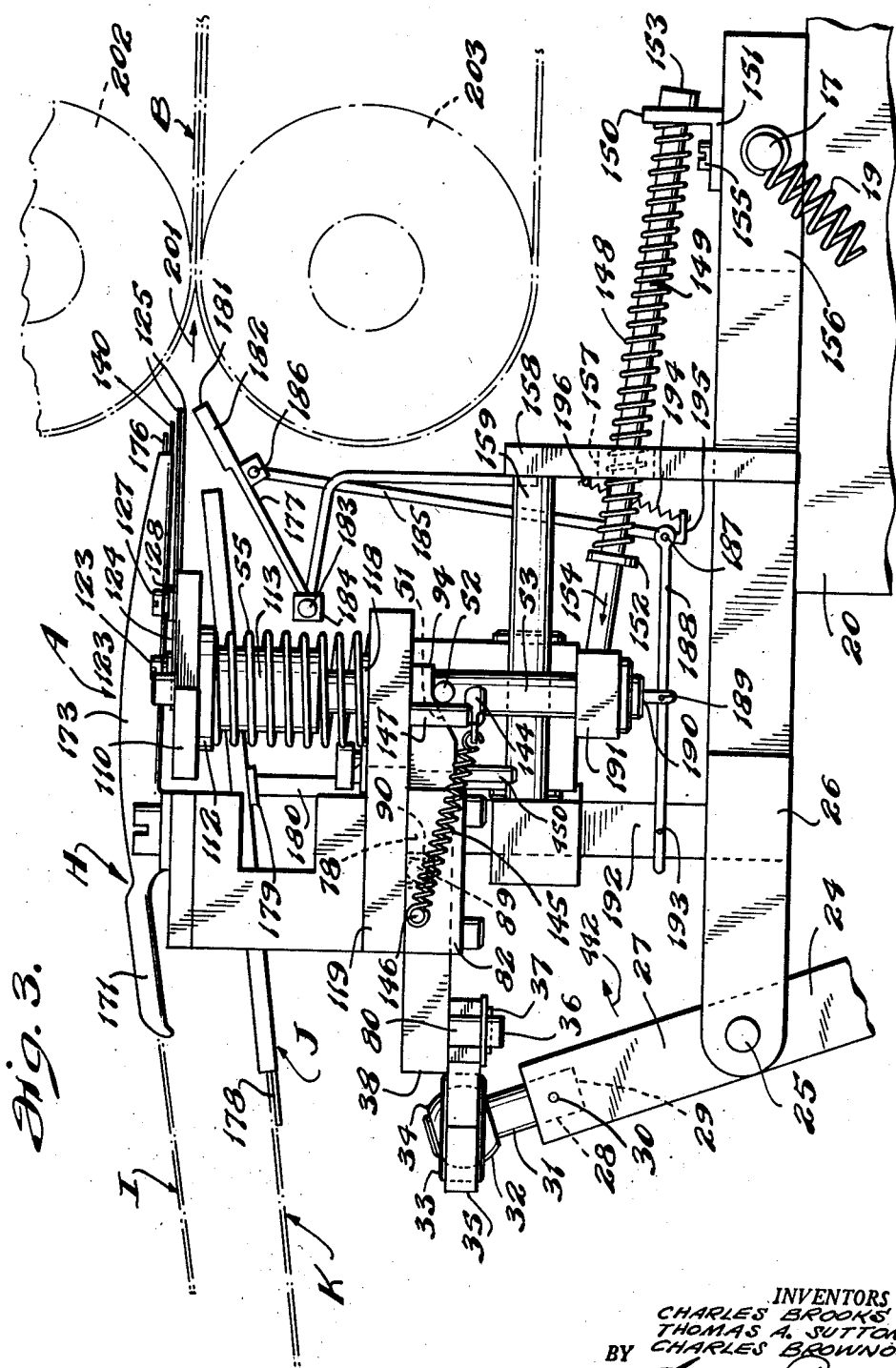

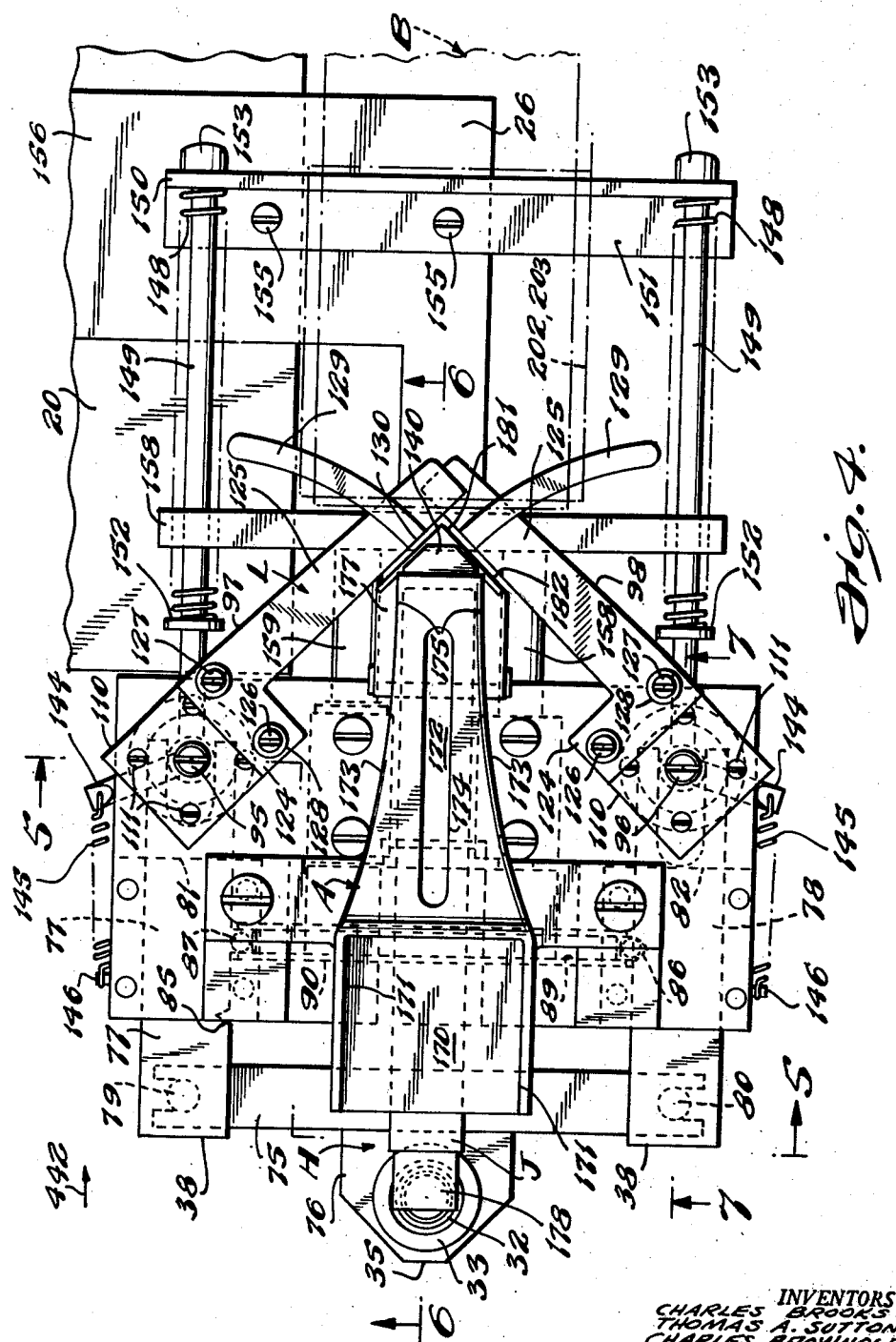

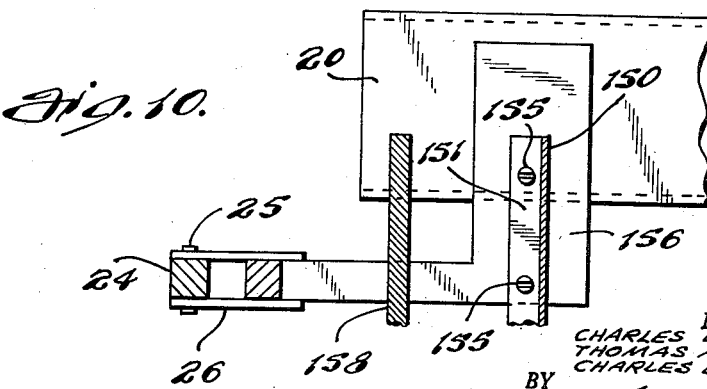

Sept. 24, 1957
C. BROOKS ET AL
2,807,307
APPARATUS FOR MAKING BACKED FABRIC BELTS
Filed Aug. 24, 1953
7 Sheets-Sheet 6
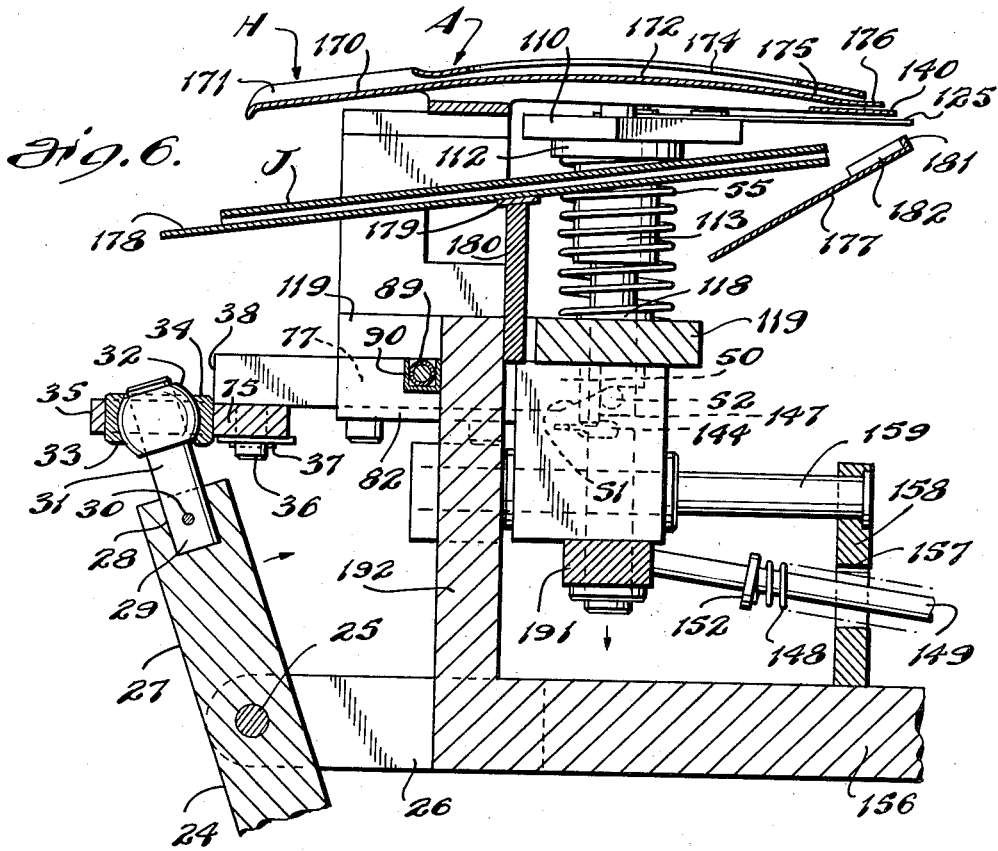
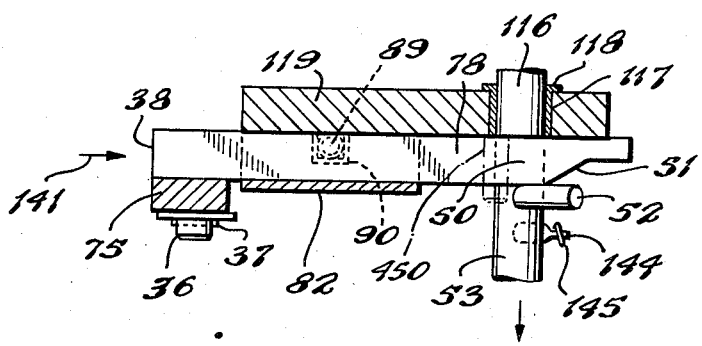
INVENTORS
CHARLES BROOKS
THOMAS A. SUTTON
CHARLES BROWNOLD
BY
ATTORNEY

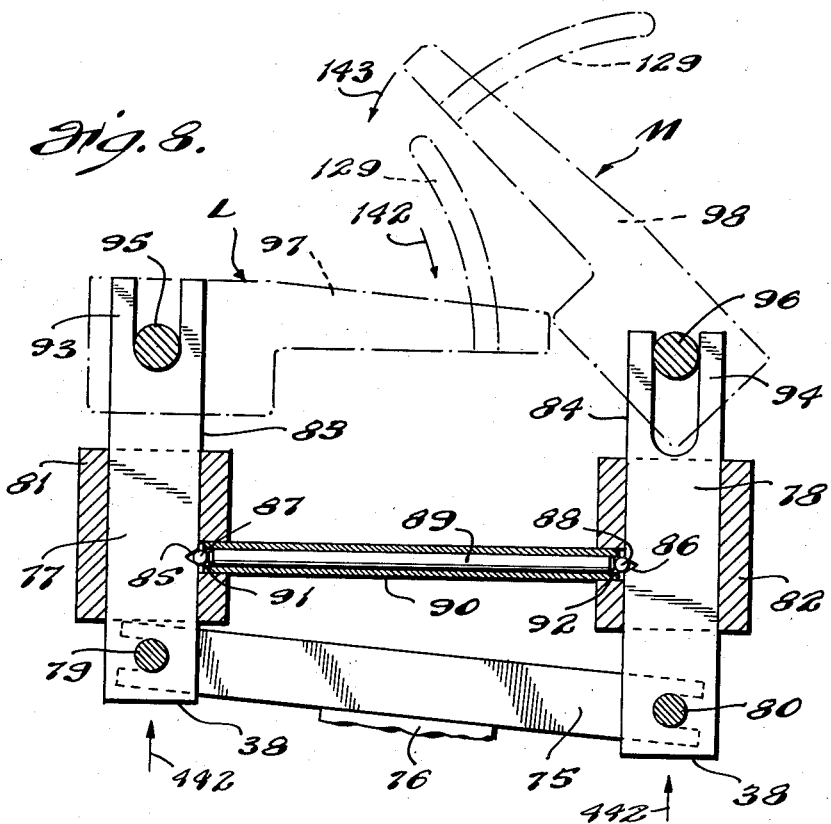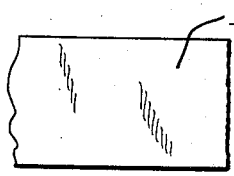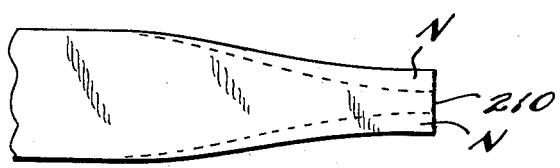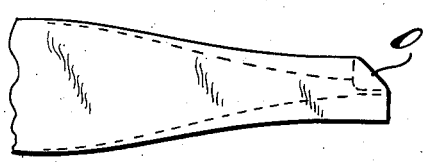

United States Patent Office 2,807,307
Patented Sept. 24, 1957

2,807,307

APPARATUS FOR MAKING BACKED FABRIC BELTS

Charles Brooks, Flushing, Thomas A. Sutton, Floral Park, and Charles Brownold, Far Rockaway, N. Y., assignors to Cee Bee Mfg. Co., Inc., Brooklyn, N. Y., a corporation of New York Application August 24, 1953, Serial No. 375,936

7 Claims. (Cl. 154—1.8)

The present invention relates to a method and machine for making belts and it particularly relates to a method and machine for making belts for a fabric facing to match a garment or dress with a plastic backing permanently attached thereto.

It is among the objects of the present invention to provide a belt making method and mechanism of the character described in which the belts may be manufactured in large quantities with a minimum of manual labor, with an assurance of uniformity of production and high quality.

Another object is to provide a belt making machine and mechanism in which various fabrics may be folded and assembled with a plastic backing so as to make the belt structure ready for stitching and further manufacturing operations without excessive manipulations and without requiring a large number of operators and assemblers.

A still further object of the present invention is to provide a novel fabric belt construction with a plastic backing in which the belt will be made at a relatively high rate of production with assurance of substantially permanent connection of the belt facing and the plastic backing, and with a maximum of conformation between the belt and the plastic backing in size and shape.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

According to the present invention a strip of plastic backing material, such as a resin impregnated plastic acetate material such as impregnated cellulose acetate, nylon, ethyl cellulose or other thermoplastic sheet strip of woven fibrous materials, is cut into belt lengths and then assembled with a folded fabric strip.

In one form of the invention a fabric strip which is usually of a woven dress or garment fabric is fed into a folding mechanism in a width substantially wider than the pre-cut plastic backing, and then the sides of the strip are folded inwardly and cemented to the plastic backing.

An important feature of the present invention resides in the folding of the beginning of the strip of material so that its ends are attached to and cemented down to the pointed plastic backing so as to conform thereto.

In a preferred form of the invention a folder is arranged which will first fold under the corner and then under the other corner of the fabric facing strip after the side edges have been folded inwardly. Then the fabric material with the plastic backing is picked up by a double belt and run between a series of pressing irons which will press the fabric material down to the plastic backing and cause a permanent adhesive connection there between the belt back and face, and after the heat attachment may be stitched so as to form the final belt construction.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side elevational view of a complete assembling and adhesive attachment mechanism according to the present invention.

Fig. 2 is a top plan view from the line indicated by the numerals 2—2 of Fig. 1.

Fig. 3 is a side elevational view of the folder unit at the front or left side of the mechanism as shown in Figs. 1 and 2 and upon an enlarged scale as compared to Figs. 1 and 2.

Fig. 4 is a top plan view of the feed and folding arrangement for assembling the plastic backing and the fabric and folding the same together before the combined fabric and plastic backing are picked up by the belt and fed to the hot irons which form the permanent adhesive connection.

Fig. 5 is a transverse vertical sectional view upon the line 5—5 of Fig. 4.

Fig. 6 is a transverse vertical sectional view upon the line 6—6 of Fig. 4.

Fig. 7 is a fragmentary detail side sectional view upon the line 7—7 of Fig. 4.

Fig. 8 is a fragmentary diagrammatic sectional view upon the line 8—8 of Fig. 5.

Fig. 9 is a transverse horizontal fragmentary sectional view upon the line 9—9 of Fig. 1 showing the foot treadle arrangement.

Fig. 10 is a horizontal fragmentary transverse sectional view upon the line 10—10 of Fig. 1 and upon an enlarged scale as compared to Fig. 1.

Fig. 11 is a transverse fragmentary vertical sectional view upon the line 11—11 of Fig. 9 upon an enlarged scale as compared to Fig. 9 showing the heat ironing arrangements.

Fig. 12 is a horizontal sectional view upon the line 12—12 of Fig. 11.

Figs. 13a, 13b, 13c and 13d are diagrammatic views showing the steps in the formation of the folded point of fabric facing of the belt arrangements.

Referring to Figs. 1 and 2 there is shown a folder and guide A together with a belt arrangement B and an ironer arrangement C which are supported upon the frame D. The machine is provided with an electrical control cabinet E (see Fig. 2). A motor F is positioned in the frame for operating the machine and the foot pedal G enables the operator to control the feeding and folding operations.

Referring to Fig. 3 the folder A has an upper guide member H for the fabric facing material I. The guide J receives the stock or adhesive backing K and the material is folded by the folder A, and assembled with the stock K and then fed into the belt arrangement B.

The folder A has a double folder arrangement including the first folder L and the second folder M which are moved in succession to fold the forward end of the belt to obtain the desired point. This is best shown in Figs. 13a to 13d where the fabric I is first fed in as a relatively wide strip, as shown in Fig. 13a, to the folder mechanism, which is shown in large scale in Figs. 3, 4, 5 and 6. Then the side edges are folded inwardly as indicated at N—N. Then the left corner is folded inwardly and under the strip, as indicated at O in Fig. 13c, by the initial swinging folder L. Finally the other corner P is folded inwardly and under by the second folder M to form the V-pointed end shown in Fig. 13d.

The ironing ararngement is shown best in Figs. 11 and 12, and the assembled folded strip Q consisting of the fabric face and adhesive backing is passed between the belts B which are heated by the heater elements R below and the hot irons S. The assembled fabric strip and plastic backing is carried, as indicated in Fig. 1, to the discharge end T of the machine where the finished articles, as indicated by the dot and dash lines U, are discharged into a bin not shown ready for stitching.

Referring to the assembling and folding mechanism shown in small scales in Figs. 1 and 2 and in enlarged scale in Figs. 3, 4, 5 and 6, this mechanism is operated by means of the foot pedal or treadle arrangement G. The foot treadle consists of a bar 10 with an end plate 11 which is mounted upon the cylindrical pivot rod 12. The pivot rod 12 is mounted upon the gears 13 projecting forwardly from the portion 14 of the frame D.

Connected with the tube or rod 12, which moves with the treadle 11, is a lever 14 having a pivotal connection at 15 to the upwardly extending link 16. The link 16 is provided with a spring 17 extending between the connection point 18 on the link 16 and the mounting 19 on the beam member 20.

The upper part of the vertical bar 16 has a pivotal connection to the link 22. The link 22 has a pivotal connection at 23 to the bar at 24.

Referring to Figs. 3 and 6 the bar 24 is pivotally mounted at 25 on the forwardly extending frame arms 26. These frame arms 26 are mounted upon the frame element 20. The upper end 27 of the oscillating member 24 has a recess 28 to receive the stud 29 which is held in position by the pin 30. The stud has a shank 31 with a ball 32. The ball 32 is held between the cups 33 and 34. The cups 33 and 34 are held in position by the frame 35 which is mounted upon the downwardly extending pivot studs 36 and held in position by the split pin 37. The split pin 37 is connected to and extends downwardly from the reciprocating bar 38. The bar 38 has a forwardly extending portion 50 with the cam face 51 which will act upon the pin 52. The pin 52 is mounted upon the vertical shaft 53. The cam face 51 when it rides over the pin 52 will force down the shaft 53 which in turn will cause the portions 110 to move downwardly, pressing the spring 55. The portions 110 will move down in sequence and then move inwardly to give the V-pointed end as shown in Fig. 13d.

At the same time the transverse bar 75 will be moved forward by the structure 76 from the lever 27 through the ball crank 32 (see Figs. 4 and 8). The bar 75 extends between the side slide bars 77 and 78 and it engages the pins 79 and 80 connected to said slide bars 77 and 78 (see Fig. 8). The slide bars 77 and 78 slide in the bearing and guide members 81 and 82. The inside edges 83 and 84 of the slide bars 77 and 78 are provided with notches 85 and 86 which are designed to cooperate with the locking balls 87 and 88 at the ends of the lock rod 89, which is held in the transverse tube 90 extending between the openings 91 and 92.

The slide bars 77 and 78 extend forwardly to the clevis portions 93 and 94 which engage the studs or pins 95 and 96 and cause successive inward movement of the left folder member 97 and then the right folder member 98.

The left folder member 97 will form a corner fold O as shown in Fig. 13c, while the right folder member 98 will form the corner fold P to complete the point fold as indicated in 13d. The swinging folder members themselves are best shown in Figs. 4 and 5.

Referring to Figs. 4 and 5 the folder members 97 and 98 consist of a base mounting portion 110 which is held in position by means of the screws 111 upon the flange 112 at the top of the sleeve 113. The sleeve 113 is encircled by the spring 55 which reacts upwardly against the flange 112. The sleeve 113 fits around the shaft 114 which is keyed at 115. The shaft 114 extends downwardly at 116 through the bearing 117 which has a flange 118 on the mounting bar 119 (see Fig. 5). The shaft 114 has a tapped recess 120 at its upper end which receives the shank 122 of the screw 123. The screw 123 mounts the plate 110 to the central shaft 114.

The enlarged base portions 124 of the plate extensions 125 of the folder members 97 and 98 are held in position by means of the screws 126 and 127 with the washers 128. The extensions 125 are provided with the arcuate bars 129 which extend from the forward edge at 130 to a rear position so that they will at all times extend below and hold the first corner fold O and then the second corner fold P in position after once they are formed.

As is shown in Figs. 4 and 8 the bars 38 as they advance will lower first the left folder 97 and then the right folder 96 before they swing inwardly below the plate 140.

It will be noted by referring to Fig. 7 that the bar 78 through its cam surface 51 will lower the pin 52 from the position of Fig. 3 to the position of Fig. 7 as the bar moves forwardly in the direction 141. At the same time the left folder member 97 and the right folder member 98 will be moved successively inwardly in the direction indicated by the arrows 142 and 143 in Fig. 8. Each of the swinging sleeves 113 and shaft 114 of the swinging folder members 97 and 98 are provided with extension arms 144 to which is connected the coil spring 145. The coil spring 145 extends rearwardly to engage the stud 146 and to pull the folder members reversely in the position as shown in Fig. 4 after the folding operation has been completed, and the folded strip P is advanced to between the belts B of Fig. 3.

The downwardly extending pins 147 (see Figs. 3 and 6) will act to stop the movement of the pins 52 and the shafts 116 as they are returned to the position of Fig. 4 by the springs 145. The entire moving carriage structure is returned by means of the spring 148 which encircles the rod 149 and reacts at one end against the vertical element 150 of the angle 151 and at the other end against the annulus 152.

The head 153 will stop the movement of the rod 149 in the direction 154. In the reverse direction the head 153 will be moved away from the vertical element 150 of the angle 151. The base of the angle 151 is held in position by the screw 155 upon the frame structure portion 156. It will be noted that the rod 149 and the spring 148 extends through the opening 157 of the vertical plate 158 which carries the slide rod guides 159. The slide rod guides 159 act as the main bearing for the reciprocating structure and they fit in the recesses 160 as shown in Fig. 5 in the sides of the sliding structure.

The longitudinal folder member H, which folds the material from the flat strip of Fig. 13a and converts it into the longitudinally folded strip of Fig. 13b, is shown best in Figs. 3, 4 and 6.

The fabric material is first fed in the entrance portion 170 with the side guides 171. It then passes over the plate 172 while the edges are folded under by the convex sides 173 to give the two longitudinal folds N of Fig. 13b. This folding operation may be observed through the slot 174 in the top of the folder.

The entrance portion of the folder at 170, between the side flanges 171, will open up to the vertical edge portion 172. As the piece is folded it becomes narrower until the narrowest section is indicated at 175 when it will come out to the point 176 directly over the point 140. At this point the forward end of ribbon or fabric facing will be folded as shown in Fig. 13b.

At the same time a cut strip of stock or backing material K is inserted in the guide J. The guide J is a folded strip of metal through which stock K may be guided until it is stopped by the swinging stock element 177.

The guide J has an open entrance ledge 178 and it is supported by the plate 179 on the vertical partition 180 and it guides the stock up to the stop edge 181 in the forward end of the flanges 182 on the swinging member 177. The swinging member 177 is pivotally mounted at 183 on the block 184, and it may be pulled down by means of the rod 185 pivotally connected at 186.

The rod 185 extends down to the pivotal connection 187 to the transverse rod 188 which has a pivotal connection at 189 to the stud 190. The stud 190 extends down from the block 191 connected to the lower extension 53 of the shaft 116. The rod 188 is pivotally connected at its end to the post 192 by the pivot connection 193. The spring 194, connected between the flange 195 and the stud 196, will normally draw the rod 185 upwardly into the position of Fig. 3.

In this position the forward end of the piece of stock which is cut with a corner to conform to the folded end of Fig. 13d, is stopped by the flange 181, as shown in Fig. 6, until the folding is completed as indicated by the successive Figures 13a, 13b, 13c and 13d. Then, by drawing downwardly upon the stop 177, the stock K and the folded material I may be advanced together to be picked up between the belts B where they are pressed together with an application of heat to form a junction ready for stitching.

In operation the strip of fabric material which serves as the facing, as indicated at I in Fig. 13a, is placed in the inlet portion H of the cloth guide A, said inlet portion having a side flange 171 and the base 170.

Then, as the cloth is pushed under the edge 172 it is gradually folded downwardly and under by the converging edges or folding portions 173 to the shape as indicated in Fig. 13b, until it projects beyond the pointed edge 140 of the folder structure A. At this point the fabric facing will have the two side folds N—N as shown in Fig. 13b.

Then the stock, which has already been cut with a pointed forward corner as indicated at K, is pushed in through the guide J over the inlet lip 178 until it is stopped against the flange 181 on the stop 177. At this point the strip of fabric, folded as indicated in Fig. 13b, will be directly above the point 140 with its forward edge 210 as shown in Fig. 13b being directly above the forward end of the point 140.

Then the treadle or foot pedal 11, as shown in Figs. 1 and 9, is pressed downwardly against the spring 17. This will turn the tube 12, lowering the lever 14 and drawing down on the vertical link 16. This motion will press the link 22 forwardly swinging the lever 24 upon the pivot 25 (see Figs. 1 and 3). The ball crank 32 held between the cups 33 and 34 will press forwardly on the member 35 which is connected to the slide members 38, which have the forwardly extending bars 77 and 78 riding in the bearing guides 81 and 82 (see Fig. 8). These bars will press forwardly on the entire structure carrying the longitudinal folder A, the guide J and the point folders M and N.

As best indicated in Fig. 8 the bar 77 will slide forwardly first moving the folder 97 inwardly by the stud 95. Then when the ball 87 engages the notch 85 the bar 78 will slide forwardly disengaging the ball 88 from the notch 86.

These folder members 97 and 98, or as they are broadly indicated by their letters L and M, will both rotate on the shaft 116 in the bearing 78 and will also be successively lowered against the spring 55.

This is accomplished by the cam faces 51 pressing downwardly on the pins 52 and lowering the folders 97 and 98 so that they will fold in first the corner O and then the corner P as indicated in Figs. 13c and 13b so that the fabric face will now match the shape of the stock.

As the elements are moving forwardly on the guide 158 the springs 148 on the rods 149 will be compressed and the springs 145 attached to the swinging folder members 97 and 98 will be extended and stressed. As soon as the folding has been completed and the strip, consisting of the folded facing and stock backing, push forward between the belts B, the springs 145 and 148 will return the mechanism to the position as shown in Figs. 3 and 4.

As the folder structure is being lowered the stock stop 182 will also be lowered by the rod 188 attached to the pivot pin 190 against the spring 194, and it will similarly be restored upon restoration of the folder members 97 and 98.

As shown in Fig. 3 once the assembly is made the fabric facing, folded as shown in Fig. 13d, and the stock will be pushed forwardly as indicated at 201 between the belts B which are riding on the upper roller 202 and the lower roller 203 (see Fig. 3) The ironing and heating apparatus for causing the permanent junction between the adhesive stock strip is best shown in Figs. 1, 2, 11 and 12.

As stated before the belts will turn over the rollers 202 and 203 and when held between the belts B will pass between the upper pressing irons 204 and the lower electrically heated platen 205.

The presser irons are best shown in Fig. 11 and they consist of a series of electrically heated irons having the upwardly extending studs 206 which extend through the openings 207 in the plate 208. The plate 208 has an angle end portion 209 which is mounted by the bolt 210 to the frame structure 211 (see Fig. 11).

The irons 204 which are arranged in end to end relationship as shown in Fig. 1 are all loosely held in the openings 207 with the bolt heads 212 limiting downward movement of the irons 204. These irons will press downwardly upon the belts B between which is located the work Q consisting of the upper folded fabric face and the lower thermoplastic adhesive stock.

The electrically heated base or platen 205 has a series of longitudinal grooves 213 which receive the elongated heating elements R so that the belts B are heated both above by the loose irons 204 as well as from below by the elongated heating resistor elements R.

The side of the structure is provided with the heat sensitive bulb element or heat sensitive control element 214. The belts carrying the structure and folded fabric facing Q will move forwardly under the pressing irons 204 and the heated platen 205 until they reach the electrically heated roller 215 supported on the shaft 216 which is driven directly from the motor 217. A belt or chain may be used connecting the motor 217 and the shaft 216 of the electrically heated roller 215. This roller shaft 216 is supported on the bracket 218 (see Fig. 9).

From the roller 215 the belts with the enclosed work pass over the roller 219 having the shaft 220 which is supported upon the bracket 221 mounted at 222 on the frame structure 223. The belts then separate as indicated at the point 224 with the upper belt B passing over the roller 225 and the lower belt B passing over the lower roller 226 (see Fig. 1). The upper roller 225 is spring loaded and is mounted upon a shaft 227 on the bracket 228 having the upstanding bar 229.

The lower roller 226 has the shaft 230 mounted on the bracket 231 having the pivotal connection 232 to the frame at 233. The finished work drops as indicated at U to a place of collection. This finished work will consist of a folded fabric face folded as indicated in 13d adhesively connected to a plastic backing so that it can be readily picked up and stitched.

It is thus apparent that the applicants have provided a simple mechanism for processing fabric belts and particularly for assembling a relatively wide strip of fabric with a relatively narrow adhesive stock by first folding the fabric longitudinally and then subjecting it to corner folding and assembling it upon a plastic stock with the folded fabric and the plastic stock being connected together. This connection is a heat adhesive connection achieved by passing the assembled folded fabric facing and stock backing between two heat resistant belts B which are subjected from above by heat and pressure arising from the heating irons 204 and from below by the heat from the platen 205 arising from the longitudinal heating elements R.

As shown in Fig. 2 there is a control box 250 which is provided with automatic timing controls for turning on and off the heat and particularly for turning on the heat a certain number of minutes or hours before the machine is to start functioning so that the irons 204 and the platen 205 will be elevated to the proper temperature when the operator is ready to start working on the machine.

The clock mechanism in the control box 250 will also be operated by means of the control tube 214 to cut off the heat when too high a temperature is achieved.

The platen 205 is normally made of a heat resistant material and it has a covering of Transite which will permit the heat to pass into the belt without direct contact between the heating members and the belt.

The long arms 129 on the folders 97 and 98 are particularly of value in that they hold the corner folds O and P in position until the assembled stock and folded fabric facing is placed between the belts B.

The under frame structure D may take a variety of forms and may consist of a series of vertical plates bolted, riveted or welded together to form a base frame.

As many changes could be made in the above method and machine for making belts and many widely different embodiments of this invention could be made without departing from the scope of the claims, it is indended that all matter contained in the above description shall be interpreted as illustrative and not in a limiting sense.

Instead of or in addition to the foot treadle 11, it is possible to use a pneumatic cylinder, indicated diagrammatically at 440 in Fig. 1, which would push forward on the link 16 in the direction 441, which would swing the upper end 27 of the oscillating member 24 to the right, as indicated by the arrow 442.

This operation, which has been previously stated in detail, may be summarized by reference to Figs. 3 and 4 as follows:

Since the ball 87 has not been locked in the notch 85 in the bar 77, this bar will be moved forwardly in the direction 442 (see Figs. 3, 4 and 8), with the cross bar 75 taking the oblique position as shown in Fig. 8.

As soon as the ball 87 can snap into the notch 85, with the arm 75 contacting the bearing structure 81 at its left end, as shown in Fig. 8, the ball 88 will be released from the notch 86, permitting the righthand bar 78 also to move forward in the direction 442.

It will be noted that the arm 97 will first be moved inwardly in the direction 142 in Fig. 8 followed by the arm 98 which moves inwardly as indicated at 143 after the movement of the arm 97.

When this occurs, the cam face 51 on the lower face of the bars 77 and 78 will slide over the pin 52 on the shaft 53, lowering the shaft 53 and also the arms 97 and 98 in succession.

The rotary movement of the shaft 53 is caused by contact between the downwardly extending stud 450 (see Fig. 3) and the extension arm 144. The stud 450 will act against the spring 145 in the swinging or rotating shaft 53, moving the arms 97 and 98 in the direction 142 and 143, as shown in Fig. 8.

Although the arm 97 is shown as moving inwardly first with the arm 98 moving inwardly secondly after each arm has been depressed to form the corners O and F of Figs. 13c and 13d, it is obvious that a reverse operation could also take place.

Having now particularly described and ascertained the nature of the invention, and in what manner the same is to be performed, what is claimed is:

1. A belt making machine for folding, assembling and obtaining heat adhesion of a fabric facing and a plastic stock backing, said machine including means to feed belt-making materials horizontally from one end of the machine to the other end of the machine and including an initial assembly position in which the materials are fed horizontally and parallelly, a second folding position and a final heat assembly position through all of which positions the materials are fed horizontally and also which comprises a fabric folding member, a stock backing guide member to guide said stock to the same position as the folded fabric, and heating belt means to engage the assembled stock and fabric and cause adhesive connection between the stock and fabric.

2. A belt making machine for folding, assembling and obtaining heat adhesion of a fabric facing and a plastic stock backing, said machine including means to feed belt-making materials horizontally from one end of the machine to the other end of the machine and including an initial assembly position in which the materials are fed horizontally and parallelly, a second folding position and a final heat assembly position through all of which positions the materials are fed horizontally and also which comprises a fabric folding member, a stock backing guide member to guide said stock to the same position as the folded fabric, and heating belt means to engage the assembled stock and fabric and cause adhesive connection between the stock and fabric, said folding member first folding the fabric longitudinally and then inwardly folding the corners of the forward end of the fabric.

3. A belt making machine for folding, assembling and obtaining heat adhesion of a fabric facing and a plastic stock backing, said machine including means to feed belt-making materials horizontally from one end of the machine to the other end of the machine and including an initial assembly position in which the materials are fed horizontally and parallelly, a second folding position and a final heat assembly position through all of which positions the materials are fed horizontally and also which comprises a fabric folding member, a stocking backing guide member to guide said stock to the same position as the folded fabric, and heating belt means to engage the assembled stock and fabric and cause adhesive connection between the stock and fabric, said stock backing guide having a retractable stock stop member to cause alignment of the forward ends of the folded fabric and stock.

4. A belt making machine for folding, assembling and obtaining heat adhesion of a fabric facing and a plastic stock backing, said machine including means to feed belt-making materials horizontally from one end of the machine to the other end of the machine and including an initial assembly position in which the materials are fed horizontally and parallelly, a second folding position and a final heat assembly position through all of which positions the materials are fed horizontally and also which comprises a fabric folding member, a stock backing guide member to guide said stock to the same position as the folded fabric, and heating belt means to engage the assembled stock and fabric and cause adhesive connection between the stock and fabric, said heating belt means including two heat resistant belts and pressing irons above said belts and a heating platen below said belts.

5. A belt making machine for folding, assembling and obtaining heat adhesion of a fabric facing and a plastic stock backing, said machine including means to feed belt-making materials horizontally from one end of the machine to the other end of the machine and including an initial assembly position in which the materials are fed horizontally and parallelly, a second folding position and a final heat assembly position through all of which positions the materials are fed horizontally and also which comprises a fabric folding member, a stock backing guide member to guide said stock to the same position as the folded fabric, and heating belt means to engage the assembled stock and fabric and cause adhesive connection between the stock and fabric, said fabric folding member including sequential inwardly swinging folding members which successively fold the forward corners of the fabric.

6. A machine for making folded-under, cloth-faced, thermoplastic fabric backed belts, having pointed forward ends, said machine including means to feed belt-making materials horizontally from one end of the machine to the other end of the machine and including an initial assembly position in which the materials are fed horizontally and parallelly, a second folding position and a final heat assembly position through all of which positions the materials are fed horizontally and also comprising means to supply the thermoplastic backing, means to supply and fold under the sides of the fabric strip in superimposed relationship to the thermoplastic backing, means to fold obliquely one corner of the folded fabric strip under the folded strip and means to fold obliquely the other corner of the folded fabric strip under the folded strip and means to heat-seal the folded fabric strip to the thermoplastic backing.

7. A V-pointed end belt-making machine of the type wherein a folded fabric is heat and pressure sealed to a plastic strip backing, said machine having an initial supply position where the fabric is fed together with the plastic backing horizontally and in parallelism to a second folding position where the side edges of the belt are first folded under and inwardly on the side toward the backing and the forward corners are then folded in sequence to form a V-point, the final heat and pressure sealing mechanism comprising rollers receiving the folded fabric and plastic backing assembly, horizontally disposed belts carried by said rollers to carry said assembly horizontally away from said folding position and means to heat said assembly while carried by said belts.

References Cited in the file of this patent
UNITED STATES PATENTS

| | | |
|---|---|---|
| 1,802,097 | Wagenfeld | Apr. 21, 1931 |
| 2,484,336 | Epstein et al. | Oct. 11, 1949 |
| 2,509,266 | Epstein et al. | May 30, 1950 |
| 2,621,142 | Wetherell | Dec. 9, 1952 |
| 2,635,670 | Winberg | Apr. 21, 1953 |
| 2,660,219 | Haas et al. | Nov. 24, 1953 |
| 2,685,908 | Loew | Aug. 10, 1954 |